INVENTORS
ALLISON K. SIMONS
ARTHUR O. RADKE
HARVEY N. TENGLER
BY John W. Michael
ATTORNEY April 12, 1960   A. K. SIMONS ET AL   2,932,342
VEHICLE SEAT SUPPORT
Filed June 15, 1956   4 Sheets-Sheet 2
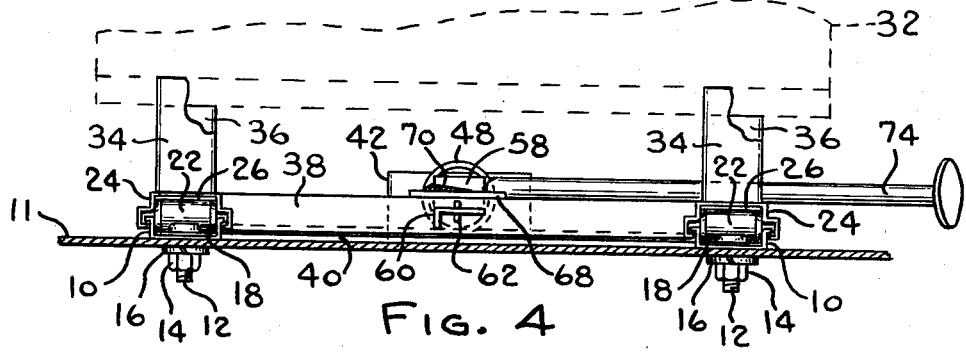
Fig. 4
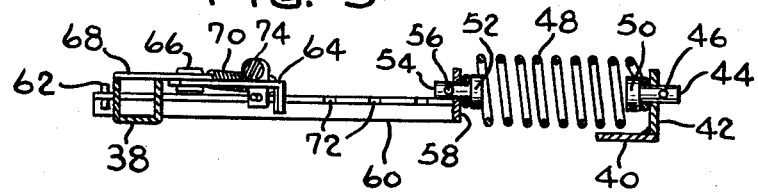
Fig. 5
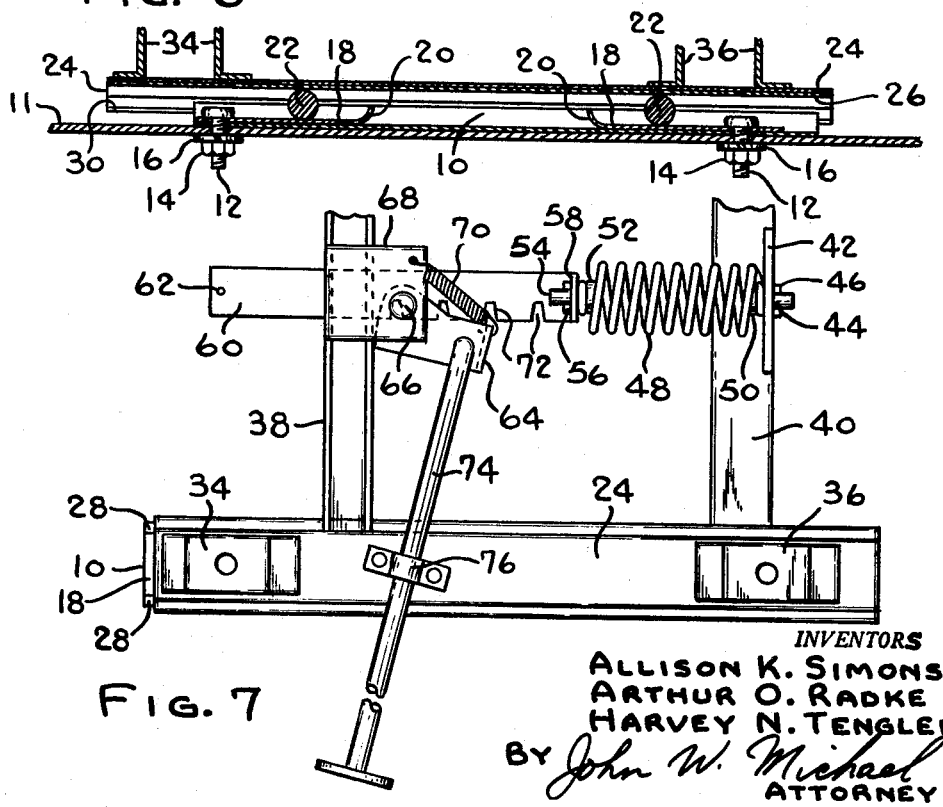
Fig. 6
Fig. 7
INVENTORS
ALLISON K. SIMONS
ARTHUR O. RADKE
HARVEY N. TENGLER
BY John W. Michael
ATTORNEY April 12, 1960  A. K. SIMONS ET AL  2,932,342
VEHICLE SEAT SUPPORT
Filed June 15, 1956  4 Sheets-Sheet 4

INVENTORS
ALLISON K. SIMONS
ARTHUR O. RADKE
HARVEY N. TENGLER
BY John W. Michael
ATTORNEY United States Patent Office
2,932,342
Patented Apr. 12, 1960

2,932,342

VEHICLE SEAT SUPPORT

Allison K. Simons, Milwaukee, Arthur O. Radke, Wauwatosa, and Harvey N. Tengler, West Allis, Wis., assignors to Bostrom Manufacturing Company, Milwaukee, Wisconsin, a corporation of Wisconsin Application June 15, 1956, Serial No. 591,609

4 Claims. (Cl. 155—14)

This invention relates to vehicle seat supports and particularly to a support which is capable of absorbing longitudinal or fore and aft shocks and vibrations to thereby isolate the occupant of the seat from the fatiguing effects thereof.

Within rather recent time attention has been given to relieving drivers of hard riding vehicles of the fatiguing effects of driving the vehicles. For many years the rough riding associated with trucks, tractors and the like was considered a necessary condition and the physical ailments caused thereby were merely written off as occupational hazards. Recently there has been great progress in design of seat supports which have greatly reduced the effects of the vertical jolts which are most severe. It has been found that there are rather considerable fore and aft shocks associated with these vehicles and which were only partially appreciated until the vertical isolation seat supports made them apparent. This invention is directed toward isolation of the driver from fore and aft shocks. The drawings show two structures for accomplishing this end in an economical manner. In each instance the structure isolates the driver only from the fore and aft motion but these structures can readily be used with vertical isolation structures and this invention contemplates use alone or in combination with vertical isolation.

The principal object of this invention is to provide structure which will isolate a vehicle seat from fore and aft shocks and vibrations.

Another object is to provide such fore and aft seat isolation structure at low cost.

Another object is to provide a seat support in which the seat is isolated from fore and aft shocks and is longitudinally adjustable to permit the driver to select the most comfortable position. The fore and aft isolation structure is equally effective in any adjusted position.

Other objects and advantages will be pointed out in, or be apparent from, the specification and claims, as will obvious modifications of the two embodiments shown in the drawings in which:

Figs. 1 to 7 illustrate one modification of the invention with Fig. 1 being a side elevation of the isolation structure with the seat shown in dotted lines;

Fig. 2 is a plan view of the support structure;

Fig. 3 is a section (taken on line 3—3 in Fig. 1) showing the rail and carriage assembly;

Fig. 4 is a front view of the support structure;

Fig. 5 is a detail section on line 5—5 in Fig. 2;

Fig. 6 is a longitudinal section through a rail and carriage assembly;

Fig. 7 is a fragmentary plan view showing operation of the seat adjustment;

Fig. 9 is a side elevation;

Fig. 10 is a front elevation;

Fig. 11 is a fragmentary section taken as indicated by line 11—11 in Fig. 9; and Fig. 12 is an enlarged detail of the seat adjuster.

Figure 1:
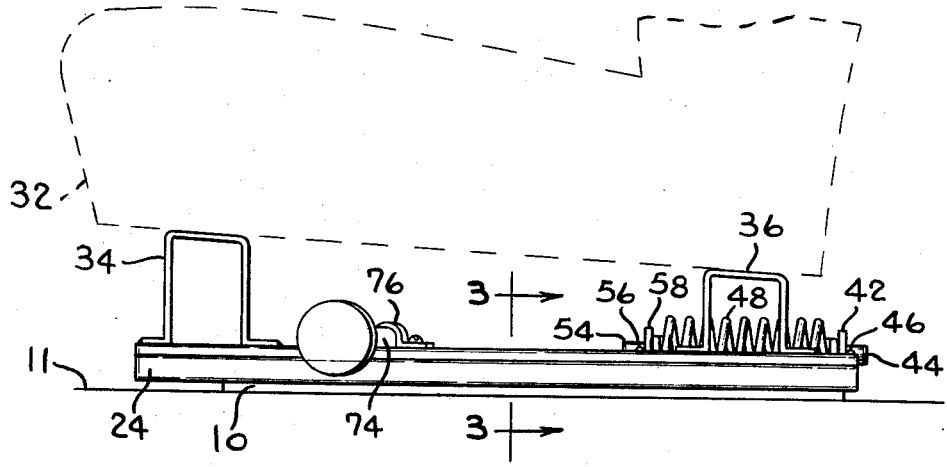
Figure 2:
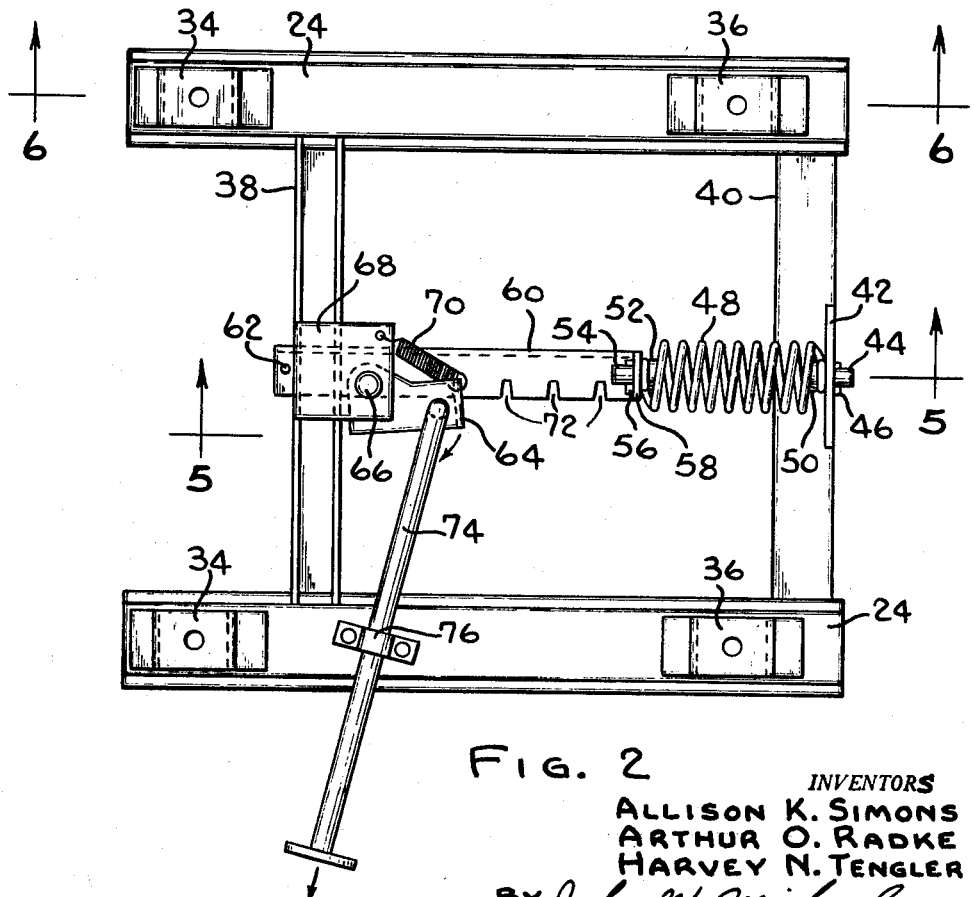
Figure 3:
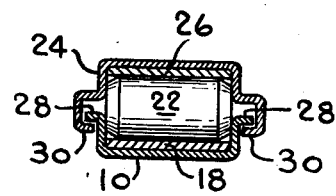

Referring to the drawings in detail, the modification shown in Figs. 1 through 7 will be discussed first. The fore and aft adjustment of the seat with respect to the vehicle and the fore and aft relative motion between the seat and the vehicle is afforded by virtue of a rail and carriage assembly which can take any of a number of forms. In the illustrated form bottom rail 10 is adapted to be secured to the floor of the truck by means of bolts 12 passing through the rail and floorboard 11 and held in place by nuts 14 and lock washers 16. When it is stated in connection with this form or in connection with the other modification that the rail is secured to the floorboard it should be understood that this rail may frequently have some other support interposed between it and the floorboard to properly incline the seat with respect to the floorboard and this other intermediate support may, if desired, incorporate structure for isolating the driver from vertical shocks and vibrations. Each bolt 12 also acts to hold in place a hardened strip 18 having an upturned end 20 acting as a stop limiting movement of roller 22. Motion of the roller in the other direction is limited by the bolt. Rather than having two strips 18 a single strip could be employed if desired with stops formed by dimpling the strip.

The roller acts to support carriage 24 which is provided with a hardened strip 26 resting on the rollers so the two rollers roll on hardened surfaces and support carriage 24. It will be noted that the upstanding sides of rail 10 are provided with outwardly projecting flanges 28 while carriage 24 is formed to provide inturned flanges 30 which underlie the flanges of the rail. The clearance shown in Fig. 3 appears to be rather substantial and is indeed more than would be encountered in practice since the adjacent faces of flanges 28 and 30 are meant to have very slight clearance therebetween, it being desirable to avoid friction at this point but, on the other hand, it being desirable to keep this clearance to a minimum in order to eliminate any appreciable vertical play at this point. Rollers 22 have chamfered ends to reduce the contact area at the ends in order to hold frictional forces at a minimum. By providing a roller of this type it is possible to fabricate a very simple rail and carriage structure with a minimum of parts and consequently at quite low cost. Since the rollers have line contact with the hardened material there is substantially no possibility of galling the hardened strips. It should be noted that, if desired, suitable stops can be formed on hardened strip 26 in carriage 24 by dimpling the hardened material.

Seat 32 is adapted to be carried by the carriage on mounting brackets 34, 36 welded to the carriage. As may be seen in Figs. 2 and 4 the carriages are interconnected by means of transverse channel 38 while the rails are interconnected by means of transverse bracket 40. The structure described up to this point would, of course, permit unlimited motion of the carriage with respect to the rails. The carriage and rails are interconnected by means which acts to limit the motion of the carriage with respect to the rail. Rail bracket 40 is provided with upstanding plate 42 to which headed pin 44 is staked at 46 to capture the right-hand end (Fig. 2) of spring 48 between head 50 and plate 42 to thus anchor the spring. The left-hand end of the spring is captured between head 52 on pin 54 staked at 56 to bracket 58 carried at the right or rear end of angle iron 60 the front end of which projects through cooperating slots in transverse channel 38 and is provided with pin 62 preventing motion of the channel beyond the limit determined by contact of the channel with the pin. The channel and thus the carriages and seat are fixed with respect to the angle by means of latch 64 pivoted at 66 on plate 68 welded to channel 38 and biased by spring 70 into engagement with any of several notches 72 along the edge of angle 60. This locks the carriages and seat with respect to the rails and thus with respect to the floorboard of the vehicle in whatever position is selected for engagement of the latch. When the latch is so engaged the normal position of the seat is determined. In order to change this normal position pin 74, pivotally connected to latch 64 and slidable in bushing 76, is pulled in the direction of the arrow to release the latch whereupon the seat may slide forward or rearward within the range of adjustments permitted. When the seat has been moved to the desired position pin 74 is released to permit spring 70 to draw the latch into the corresponding notch 72. It is to be noted that this motion has no effect on spring 48.

Having selected the correct seating distance from the steering wheel, for example, the seat is locked with respect to the floorboards but it is to be remembered that the seat is connected to the floorboard through the medium of spring 48. Thus, spring 48 may be compressed or tensioned from its normal position. Therefore, any fore and aft shocks tending to be transmitted from the truck to the seat will be absorbed or at least cushioned by spring 48, thus securing isolation of the driver from fore and aft shocks and vibrations. The action of the spring is determined by relative motion between the channels and rails.

Figure 8:
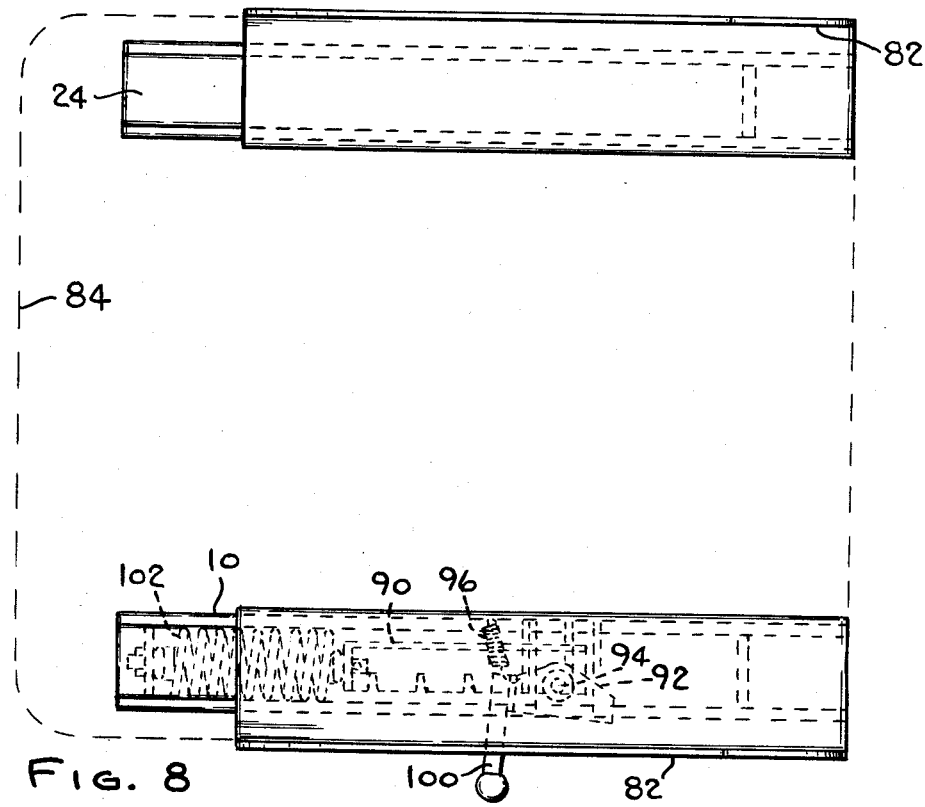
Figs. 8 to 12 show the other modification with Fig. 8 being a plan view.
Figure 9:
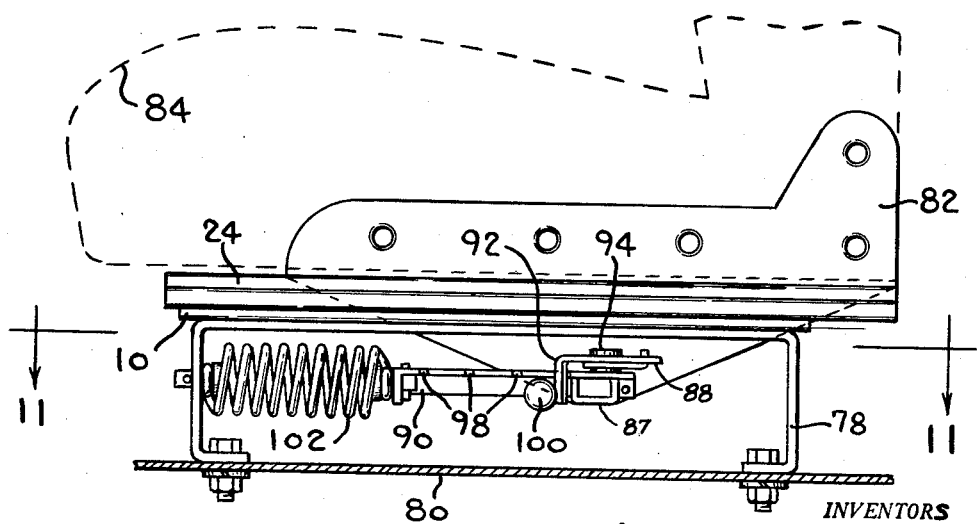
Figure 10:
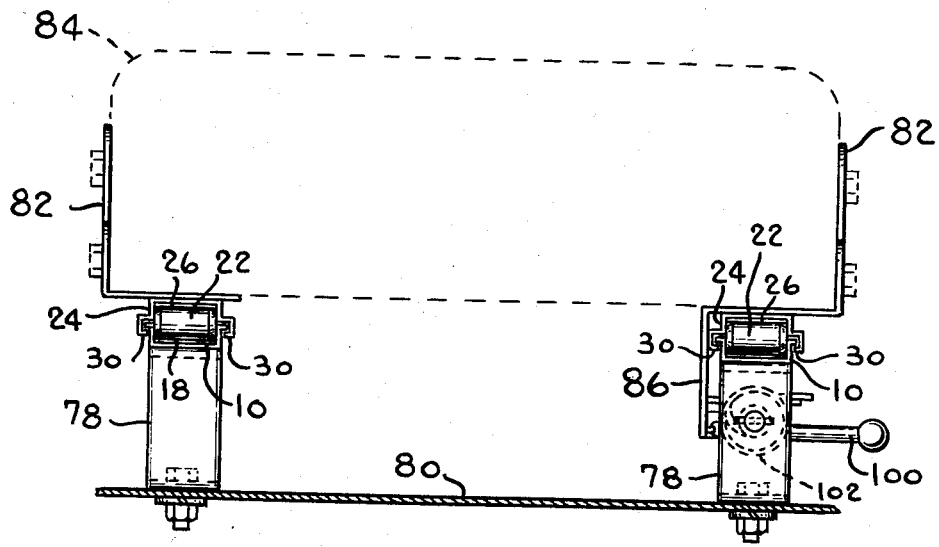
Figure 11:
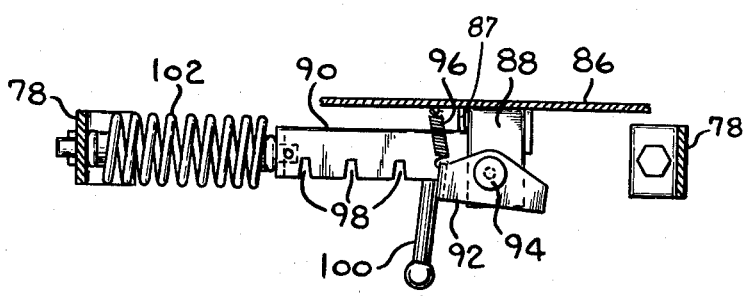
Figure 12:
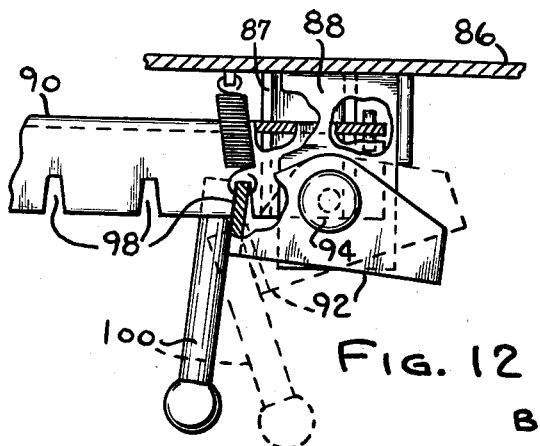

In this embodiment the seat support structure is a complete, integral unit which may be completely assembled at the factory without a seat and readily adapted for mounting a seat thereon and for mounting within the vehicle. It does, however, have the drawback of having what might be termed surplus material on it in that the cross braces 38 and 40 respectively connecting the upper carriages and the lower rails serve principally to space the rails and carriages and make the assembly rigid. The second embodiment, shown in Figs. 8 through 12, overcomes this objection in that it utilizes the rigidity of the seat structure to effect the interconnection between the channels while the floorboards are used to effect interconnection of the rails.

Referring to the second modification in detail, each bottom rail 10 is welded or otherwise secured to mounting bracket 78 which in turn is bolted to floorboard 80. Carriage 24 is secured to the seat support brackets 82 which cradle seat 84. The rail and carriage structure is much the same as that described with respect to the first embodiment and is provided with the upper and lower hardened raceways for rollers 22 and these raceways may be formed with dimples or the like to limit movement of the rollers. Since the floorboards are rigid the rails are rigidly interconnected and since the carriages are connected to the seat which has a rigid internal frame, they are effectively rigidly interconnected.

It will be noted that seat bracket 82 adjacent the door of the vehicle (appearing on the right in Fig. 10) is provided with depending skirt 86 on the inside of the rail and carriage assembly. This skirt has an outwardly projecting channel section 87 which slidably receives notched angle iron 90 and an outwardly projecting plate 88 which pivotally supports latch 92 at 94. The latch is biased by spring 96 into engagement with one of the notches 98 in iron 90. Arm 100 is secured to latch 92 for rearward pivotal motion around pivot 94 to disengage the latch from the notches to permit fore and aft adjustment of the seat position. When the latch engages one of notches 98 the seat is effectively held in its adjusted position subject to the resilient action permitted by means of spring 102 interconnecting angle 90 and the forward leg of bracket 78. The method of connecting spring 102 is much the same in this case as that described with respect to the first embodiment; that is, the ends of the spring are coiled on a reduced diameter and are captured between the heads of the mounting pins and the brackets to which the pins are secured. Therefore, the seat in this construction is resiliently supported in the fore and aft direction.

As pointed out above this construction has certain cost advantages in that it utilizes the seat frame for interconnecting the carriage members and uses the floorboards for interconnecting the rails. In both structures, however, there is a marked advantage in that the coil spring acts both in compression and tension to absorb fore and aft shocks and yet tends to assume a null point at which it is unstressed and the seat is in its normal position. The spring rate can be selected to pretty well determine the range of movement which will be permitted to the seat in absorbing the shocks. This range of movement can be, for example, a total of four inches, that is, a two inch travel in either direction. The spring cannot be too soft since this would permit excessive movement or, where limit stops are employed, would permit excessive movement ended in an abrupt halt. On the other hand, if the spring rate is too great, the effect is little or no improvement over a rigidly mounted seat.

Although but two embodiments of the present invention have been illustrated and described, it will be apparent to those skilled in the art that various changes and modifications may be made therein without departing from the spirit of the invention or from the scope of the appended claims.

We claim:

1. A vehicle seat support comprising, a fixed rail, a movable carriage mounted on said rail and adapted to be connected to a seat, anti-friction means between the carriage and the rail to support the carriage on the rail and permit longitudinal movement thereof with respect to the rail, means interconnecting the carriage and rail including a single spring which biases the carriage to a normal position with respect to the rail while yieldably resisting relative longitudinal movement between the carriage and rail, and means operable to longitudinally adjust the normal position of the carriage with respect to the rail without tensioning or compressing the spring.

2. A vehicle seat support comprising, a fixed rail member, a movable carriage member mounted on said rail and adapted to be connected to a seat, anti-friction means between the carriage and the rail to support the carriage on the rail and permit longitudinal movement thereof with respect to the rail, means interconnecting the carriage and rail members including a spring having one end fixed relative to one of said members, engaging means connected to the other end of the spring and extending from the end of the spring, and adjustable means on the other of said members for connecting the said other member to the engaging means to longitudinally adjust the position of said other member with respect to the rail without tensioning or compressing the spring.

3. The support according to claim 2 in which the engaging means is a latch plate having notches in an edge and the adjustable means includes a latch adapted for engagement with a selected notch.

4. The support according to claim 3 including a spring biasing the latch into engagement with a selected notch.

References Cited in the file of this patent

UNITED STATES PATENTS

| | | |
|---|---|---|
| 1,735,304 | Travis | Nov. 12, 1929 |
| 1,827,627 | Travis | Oct. 13, 1931 |
| 2,007,852 | Fuller | July 9, 1935 |
| 2,109,728 | Kovach | March 1, 1938 |
| 2,226,374 | Gieleghem | Dec. 24, 1940 |
| 2,278,101 | Browne | March 31, 1942 |
| 2,346,895 | Bergman | Apr. 18, 1944 |
| 2,850,073 | Smith | Sept. 2, 1958 |

FOREIGN PATENTS

| | | |
|---|---|---|
| 466,225 | Great Britain | May 25, 1937 |